(12) United States Patent  
Galbraith et al.

(10) Patent No.: US 9,036,304 B1  
(45) Date of Patent: May 19, 2015

(54) SYSTEM AND METHODS UTILIZING DUAL READ SENSORS

(71) Applicant: HGST Netherlands B.V., Amsterdam (NL)

(72) Inventors: Richard Leo Galbraith, Rochester, MN (US); Roger William Wood, Gilroy, CA (US)

(73) Assignee: HGST NETHERLANDS B.V., Amsterdam (NL)

( * ) Notice: Subject to any disclaimer, the term of this patent is extended or adjusted under 35 U.S.C. 154(b) by 0 days.

(21) Appl. No.: 14/281,461

(22) Filed: May 19, 2014

(51) Int. Cl.
    *G11B 21/16* (2006.01)
    *G11B 5/33* (2006.01)
    *G11B 5/58* (2006.01)
    *G11B 5/187* (2006.01)
    *G11B 5/48* (2006.01)

(52) U.S. Cl.
    CPC ............... *G11B 5/581* (2013.01); *G11B 5/187* (2013.01); *G11B 5/4886* (2013.01)

(58) Field of Classification Search
    CPC .. G11B 5/3967; G11B 5/3903; G11B 5/3103; G11B 5/6005; G11B 5/4886; G11B 5/58
    USPC .......... 360/126, 246.6, 313, 316, 51, 317, 31, 360/25, 39, 40, 41, 75, 113
    See application file for complete search history.

(56) References Cited

U.S. PATENT DOCUMENTS

| 6,078,454 | A  | * | 6/2000  | Takahashi et al. | 360/66 |
| 6,104,562 | A  | * | 8/2000  | Ottesen et al.   | 360/63 |
| 6,157,510 | A  |   | 12/2000 | Schreck et al.   |        |
| 8,139,301 | B1 | * | 3/2012  | Li et al.        | 360/39 |
| 8,462,468 | B2 |   | 6/2013  | Katada et al.    |        |
| 8,508,880 | B2 |   | 8/2013  | Gao et al.       |        |
| 8,514,506 | B1 |   | 8/2013  | Li et al.        |        |
| 2013/0286502 | A1 | | 10/2013 | Erden et al.   |        |
| 2013/0286511 | A1 | | 10/2013 | Edelman et al. |        |

OTHER PUBLICATIONS

Greaves et al., "Shingled recording for 2-3 Tbit/in," Transactions on IEEE Magnetics (Oct. 2009) vol. 45, Issue 10: 3823-3829.

* cited by examiner

*Primary Examiner* — Nabil Hindi
(74) *Attorney, Agent, or Firm* — Billion & Armitage; Michael A. Collins

(57) ABSTRACT

A dual-stack read sensor is utilized in a storage device having an actuator arm that positions the read sensor over a rotating storage medium. The dual-stacked read sensor includes a primary read sensor having a first set of read sensor characteristics and a secondary read sensor having a second set of read sensor characteristics that differ from the first set of read sensor characteristics, wherein the secondary read sensor is positioned relative to the primary read sensor to be radially offset from the primary read sensor relative to a data track being read.

23 Claims, 8 Drawing Sheets

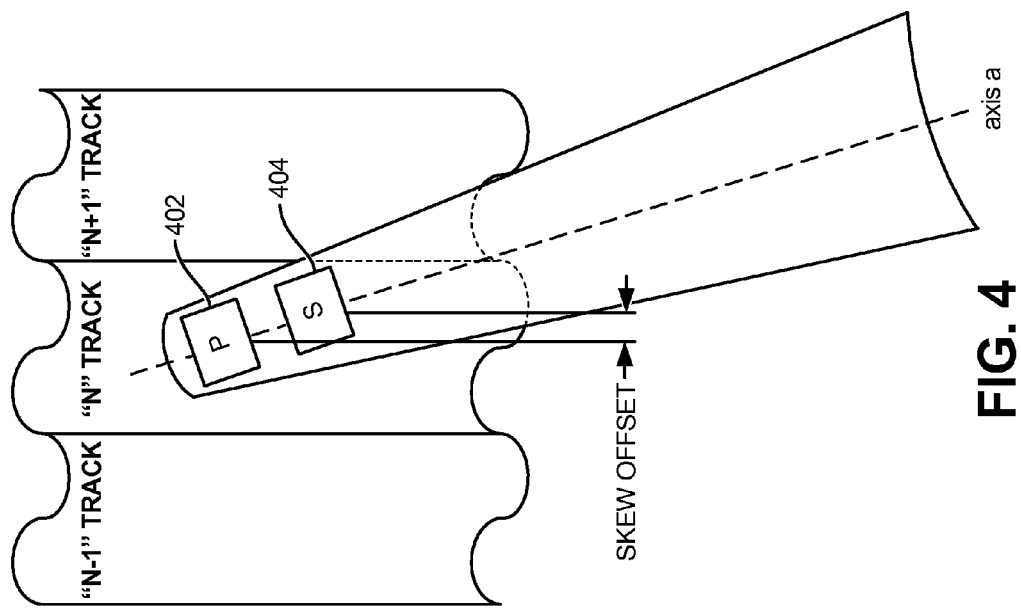

SYSTEM AND METHODS UTILIZING DUAL READ SENSORS

TECHNICAL FIELD

The present invention is related to hard disk drives (HDDs), and in particular to a read sensors and channels utilized in HDDs.

BACKGROUND

Memory storage density is a measure of the quantity of information (i.e., bits) that can be stored on a given length of track, area of surface, or in a given volume of a computer storage medium. Higher density is more desirable because it allows greater volumes of data to be stored in the same physical space. Density therefore has a direct relationship to storage capacity of a given medium. Density also generally has a fairly direct effect on the performance within a particular medium, as well as price. Hard drives store data in the magnetic polarization of small patches of the surface coating on a (normally) metal disk. The maximum areal density is constrained by the size of the magnetic particles in the surface, as well as the size of the "head" used to read and write the data.

To increase areal density, magnetic recording systems have begun using "shingled" writing schemes, in which newly written tracks partially overwrite previously written tracks. This has the effect of narrowing the previously written tracks, with resulting widths less than the width of the write head. As a result, track density and therefore areal density is increased.

However, as areal density increases, read-back of the magnetic polarization areas becomes increasingly difficult. In particular, the strength of the signal generated by the magnetic polarization of small patches of the surface of the metal disk decreases while interference from adjacent tracks increases.

Therefore, as magnetic writing technique make possible further increases in areal density, techniques must be developed to allow the smaller sized bits to be successfully read back from the storage medium.

SUMMARY

In general, this disclosure describes techniques for storing data. In particular, this disclosure describes techniques for processing signals read-back from a disk of a hard disk drive.

In an exemplary embodiment, a dual-stack read sensor utilized in a storage device includes a primary read sensor and a secondary read sensor. The primary read sensor is defined by a first set of read sensor characteristics, while the secondary read sensor is defined by a second set of read sensor characteristics that differ from the first set of read sensor characteristics. In addition, the secondary read sensor is offset, relative to a data track being read, from the primary read sensor.

In another exemplary embodiment, a read channel utilized in storage device comprises a primary read sensor, a secondary read sensor, a first filter, a second filter, and a combination block. The secondary read sensor is offset, relative to a data track being read, from the primary read sensor. The first filter is connected to the primary read sensor and is configured based on first weights to provide a primary filtered response. Likewise, the second FIR filter is connected to the secondary read sensor and is configured based on second weights to provide a secondary filtered response. A combination block combines the primary filtered response and the secondary filtered response to provide a combined readback signal with respect to a data track being read.

In another exemplary embodiment, a storage device comprises a data recording medium comprised of a plurality of data tracks, a spindle assembly configured to rotate the data recording medium, an actuator arm, a dual-stacked reader, and a two-dimensional magnetic recording (TDMR) read channel. The dual-stacked reader mounted on a distal end of the actuator arm includes at least a primary read sensor and a secondary read sensor that is offset from the primary read sensor relative to the data track being read. The TDMR read channel comprises a first filter connected to the primary read sensor, a second filter connected to the secondary read sensor, and a combination block to combine the outputs of the first filter and the second filter, wherein the first filter and second filter are designed to provide a sensor sensitivity-function geometry that approximates a geometry of a magnet written to the storage medium.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a top view illustrating in more detail a variable radial offset of the secondary read sensor relative to the primary read sensor according to an embodiment of the present invention.

DETAILED DESCRIPTION

The present invention utilizes a dual-stacked reader in a hard disk drive (HDD) system comprised of at least a primary read sensor and a secondary read sensor. The primary and secondary sensors are offset radially from one another with respect to the data track being read. Characteristics of the primary sensor—such as sensor width and sensor gap—and associated read channel are selected to maximize the primary sensor response, while characteristics of the secondary sensor and associated read channel are selected to maximize the benefit that results from combining the secondary sensor response with the primary sensor response. In this way, the sensor sensitivity-function "geometry"—resulting from the combined primary sensor response and secondary sensor response—can be modified to more closely resemble the geometry of individual magnets associated with data written to the storage medium.

Figure 1:
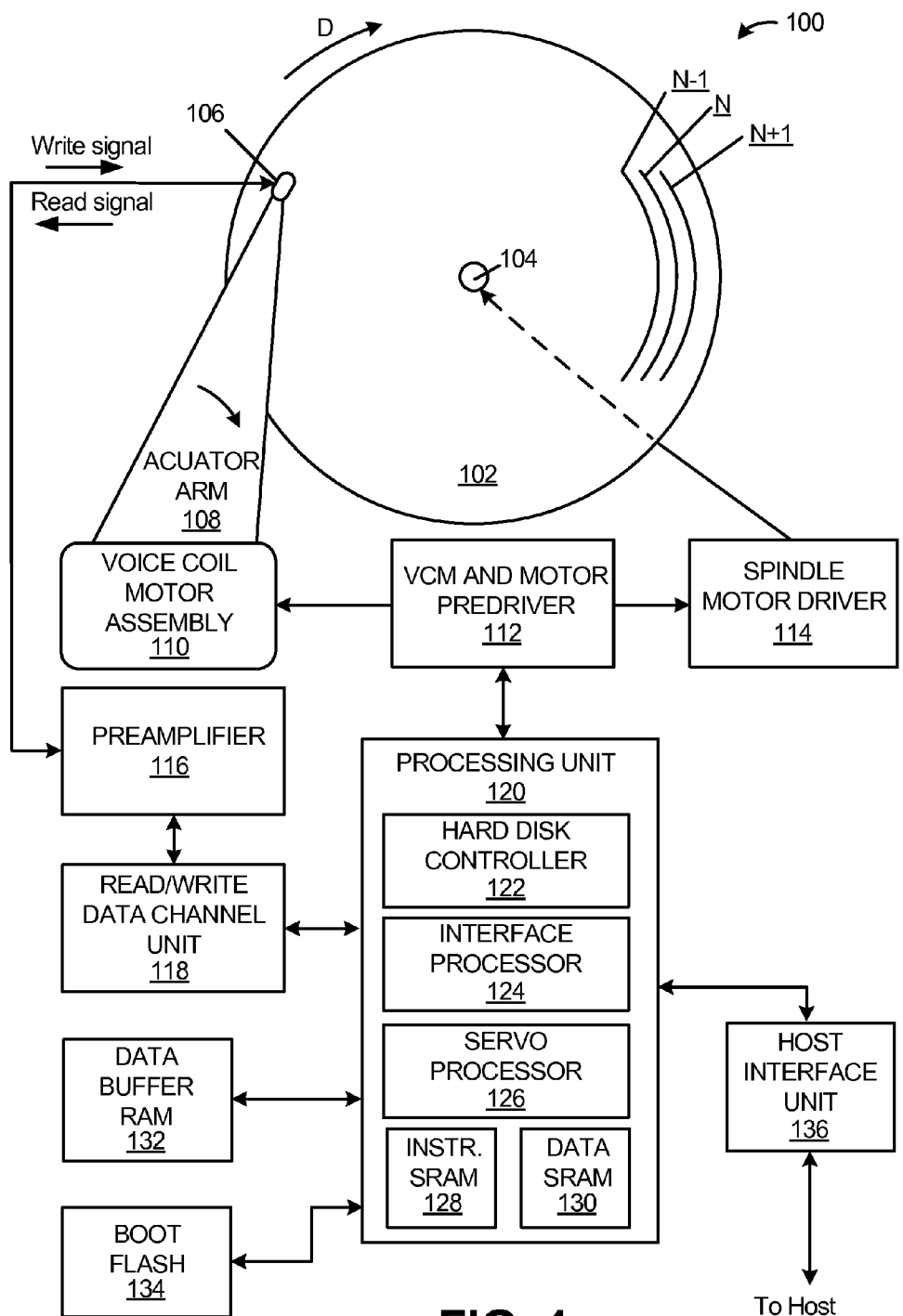
FIG. 1 is a block diagram of a hard disk drive (HDD) according to an embodiment of the present invention.

FIG. 1 is a conceptual diagram illustrating an example hard disk drive that may utilize the techniques described in this disclosure. Hard disk drive 100 may be operably coupled to a host device as an internal or external data storage device. A host device may include, for example, a laptop or desktop computer or a similar device. Hard disk drive 100, includes data recording disk or medium 102, spindle assembly 104, slider 106, actuator arm 108, voice coil motor assembly 110, VCM and motor predriver 112, spindle motor driver 114, preamplifier 116, read/write data channel unit 118, processing unit 120, data buffer RAM 132, boot flash 134, and host interface unit 136. Further, processing unit 120 includes hard disk controller 122, interface processor 124, servo processor 126, instruction SRAM 128, and data SRAM 130. It should be noted that although example hard disk drive 100 is illustrated as having distinct functional blocks, such an illustration is for descriptive purposes and does not limit hard disk drive 100 to particular hardware architecture. In a similar manner, processing unit 120 should not be limited to a particular hardware architecture based on the example illustrated in FIG. 1. Functions of hard disk drive 100 may be realized using any combination of hardware and/or software implementations.

Disk 102 includes a stack of one or more disks having magnetic material deposited on one or both sides thereof. Disk 102 may be composed of a light aluminum alloy, ceramic/glass, or other suitable substrate that magnetic material may be deposited thereon. Using electromagnetic techniques, data may be stored on disk 102 by orientating an area of the magnetic material. Data stored on disk 102 may be organized as data blocks. Data blocks are typically 512 bytes or 4 KB in size, but may be other sizes as well. The data written to disk 102 may be arranged into a set of radially-spaced concentric tracks, illustrated in FIG. 1 as N−1, N, and N+1, or spiral data tracks (not shown). A data block may be located within a sector of a particular track.

Magnetic material of disk 102 may be configured according to a plurality of magnetic recording techniques. Examples of magnetic recording techniques include longitudinal magnetic recording (LMR) and perpendicular magnetic recording (PMR). Additional magnetic recording techniques include shingled magnetic recording (SMR) and heat assisted magnetic recording (HAMR). SMR is a type of PMR that increases bit density compared to conventional PMR by allowing tracks to be written in a manner that allows overlap of one or more adjacent tracks. In an embodiments utilizing SMR, due to track overlap and write widths, tracks are written sequentially (e.g., N−1, N, N+1). In the embodiment shown in FIG. 1, data recording medium 102 is divided into an outer radial portion and an inner radial portion, with the outer radial portion written from the outer diameter (OD) toward the inner diameter (ID), and the inner radial portion written from the ID toward the OD. HAMR may be used in conjunction with LMR, PMR, or SMR techniques to achieve higher areal storage density.

As illustrated in FIG. 1, disk 102 is coupled to spindle assembly 104 and rotates in direction D about a fixed axis of rotation. Disk 102 may be rotated at a constant or varying rate. Typical rates of rotation range from less than 3,600 to more than 15,000 revolutions per minute. However, disk 102 may be rotated at higher or lower rates and the rate of rotation may be determined based on a magnetic recording technique. Spindle assembly 104 includes a spindle and a motor and is coupled to spindle motor driver 114. Spindle motor driver 114 provides an electrical signal to spindle assembly 104 and the rate at which the spindle rotates, and thereby disk 102, is proportional to the voltage or current of the electrical signal. Spindle motor driver 114 is coupled to VCM and motor predriver 112. VCM and motor predriver 112 are configured to use feedback techniques to insure disk 102 rotates at a desired rate. For example, VCM and motor predriver 112 may be configured to receive current and/or voltage signals from the motor and adjust the electrical signal provided to spindle motor driver 114 using feedback circuits that implement a feedback control loop.

As illustrated in FIG. 1, VCM and motor predriver 112 is also coupled to voice coil motor assembly 110. In addition to providing an electrical signal to spindle motor driver 114, VCM and motor predriver 112 is also configured to provide an electrical signal to voice coil motor assembly 110. Voice coil motor assembly 110 is operably coupled to actuator arm 108 such that actuator arm 108 pivots based on the current or voltage of the electrical signal received from VCM and motor predriver 112. As illustrated in FIG. 1, slider 106 is coupled to actuator arm 108. Thus, VCM and motor predriver 112 adjusts the position of slider 106 with respect to disk 102. VCM and motor predriver 112 may use feedback techniques to insure slider 106 maintains a desired position with respect to disk 102. In one example, VCM and motor predriver 112 includes an analog-to-digital converter to monitor electromagnetic fields and current from voice coil motor assembly 110.

Slider 106 is configured to read and write data to disk 102 according to a magnetic recording technique, for example, any of the example magnetic recording techniques described above. Slider 106 may include read and write heads corresponding to each of a plurality of disks included as part of disk 102. Further, slider 106 may include one or more read and write heads for each disk. Slider 106 is coupled to preamplifier 116. Preamplifier 116 may also be referred to as arm electronics (AE). Preamplifier 116 is configured to select a correct head from a plurality of heads for a particular read or write operation. The correct head is the head associated with the transducer that is being passed over the disk where information representing data is to be written or stored. Preamplifier 116 is configured to drive head 106 with a write current, during a write operation. Further, preamplifier 116 is configured to amplify read signals from slider 106, during a read operation using a programmable head bias current. Preamplifier 116 may also be configured to detect errors during each of the read and write operations. Preamplifier 116 may also include a signal adaptive filter (SAF) for thermal asperity (TA) recovery during a read operation.

Preamplifier 116 receives data to be written to disk 102 from read/write data channel unit 118. Preamplifier 116 provides data read from disk 102 to read/write data channel unit 118. Data may originate from a host device and may be communicated to read/write data channel unit 118 via host interface unit 136 and processing unit 120. Host interface unit 136 provides a connection between hard disk drive 100 and a host device. Host interface unit 136 may operate according to a physical and logical characteristics defined according to a computer bus interface. Example standardized interfaces include ATA (IDE, EIDE, ATAPI, UltraDMA, SATA), SCSI (Parallel SCSI, SAS), Fibre Channel, and PCIe (with SOP or NVMe).

As illustrated in FIG. 1, processing unit 120 includes hard disk controller 122, interface processor 124, servo processor 126, instruction SRAM 128, and data SRAM 130. Instruction SRAM 128 can store a set of operation instructions for processing unit 120. Instructions can be loaded to instruction SRAM 128 from boot flash 134 when hard disk drive 100 is powered on. Data SRAM 130 and data buffer RAM 132, which is coupled to processing unit 120 are configured to buffer blocks of data during read and write operations. For example, blocks of data received from host interface unit 136 may be sequentially stored to data SRAM 130 and data buffer RAM 132 before the data blocks are written to disk 102. It should be noted that although instruction SRAM 128, data SRAM 130, data buffer RAM 132, and boot flash 134 are illustrated as distinct memory units, the functions of instruction SRAM 128, data SRAM 130, data buffer RAM 132, and boot flash 134 may be implemented according to other types of memory architectures.

Hard disk controller 122 generally represents the portion of processing unit 120 configured to manage the transfer of blocks of data to and from host interface unit 136 and read/write data channel unit 118. Hard disk controller 122 is configured to perform operations to manage data buffering and interfaces with host interface unit 136 according to a defined computer bus protocol, as described above. For example, hard disk controller 122 can receive and parse packets of data from host interface unit 136. Further, hard disk controller 122 may be configured to communicate with host. For example, hard disk controller 122 may be configured to report errors to host and format disk 102 based on commands received from host.

Interface processor 124 generally represents the portion of processing unit 120 configured to interface between servo processor 126 and hard disk controller 122. Interface processor 122 may perform predictive failure analysis (PFA) algorithms, data recovery procedures, report and log errors, perform rotational positioning ordering (RPO) and perform command queuing. In one example, interface processor can be an ARM processor.

As described above, data is typically written to or read from disk 102 in blocks which are contained within a sector of a particular track. Disk 102 may also include one or more servo sectors within tracks. Servo sectors may be circumferentially or angularly-spaced and may be used to generate servo signals. A servo signal is signal read from disk 102 that is used to position the slider 106 with a particular sector or track of disk 102. Servo processor 126 generally represents the portion of processing unit 120 configured to control the operation of spindle assembly 104 and voice coil motor assembly 110 to insure slider 106 is properly positioned with respect to disk 102. Servo processor 126 can be referred to as a Servo Hardware Assist Real-time Processor (SHARP). Servo processor 126 may be configured to provide closed loop control for all combinations of: slider position on track, slider seeking, slider settling, spindle start, and spindle speed. Further, servo processor 126 may include a set of instructions to calculate servo related variables.

In an embodiment of the present invention described in more detail below, slider 106 includes a first or primary read sensor and a second or secondary sensor offset from the first sensor. Characteristics of the first read sensor—as well as the channel response provided by read/write data channel unit 118—are selected to maximize the on-track response of the primary sensor. Characteristics of the second read sensor—as well as the channel response provided by read/write data channel unit 118—are selected to maximize the combination of the on-track response of the primary sensor with the off-track response provided by the secondary sensor. This combination of read-back signals provided by at least two read sensors to read a single data track is referred to herein as two-dimensional magnetic recording (TDMR).

Figure 2B:
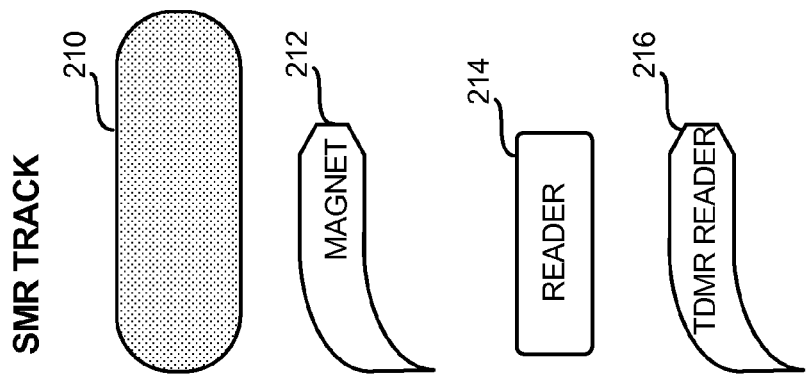
FIGS. 2A-2B are block diagrams illustrating the use of two-dimensional magnetic recording (TDMR) to modify reader "geometry" to match the geometry of written magnets according to embodiments of the present invention.
Figure 2A:
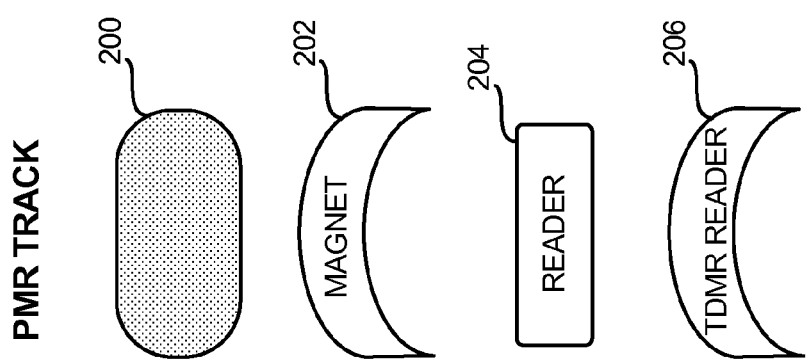

FIGS. 2A-2B are block diagrams illustrating the use of TDMR to modify reader "geometry" to match the geometry of individual magnets written to the storage medium according to an embodiment of the present invention. With respect to FIG. 2A, writer 200 is utilized to write data (i.e., control a direction of magnetization, labeled "magnet 202") according to a perpendicular magnetic recording (PMR) scheme. Written data or magnet 202 is then read back by dual-stack read sensor 204. In particular, FIG. 2A illustrates the geometry associated with write and read operations in perpendicular magnetic recording (PMR). For example, the geometry associated with magnet 202 is different than that of writer 202, with hooked-shaped portions at each end of magnet 202. Optimally, read sensor 204 (and as a result, read sensitivity function) would have the same geometry as magnet 202. However, as illustrated in FIG. 2A, the geometry of magnet 202 is different than that of read sensor 204. Through proper offset and combination of read-back signals provided by the primary read sensor and by the secondary read sensors, the "geometry" of the reader—labeled TDMR reader 206—can be modified through signal processing to more closely resemble that of magnet 202. In this way, differences between the geometry of magnet 202 and the read-sensitivity function of read sensor 204 can be compensated for electrically.

The embodiment shown in FIG. 2B illustrates the geometry associated with read and write operations in shingled magnetic recording (SMR). In contrast with perpendicular magnetic recording, shingled magnetic recording utilizes writer 210 having a write width substantially wider than read sensor 214. In particular, because data is written in SMR by partially overlapping or writing over an adjacent data track, the geometry of magnet 212 is asymmetrical in shape. In the embodiment shown in FIG. 2B, magnet 212 has the traditional hook-shape on the left side of magnet 212, while the writing of the N+1 adjacent track on the right side leaves a squared-off end. As a result, read sensor 214 has a sensitivity function geometry that differs—even more substantially than that shown in FIG. 2A—from that of magnet 212. Once again, this difference in geometry can be compensated for through proper offset of the primary read sensor and the secondary read sensor and combination of the corresponding read-back signals. As a result of this combination, the geometry illustrated by TDMR reader 216—which represents the combined read-back geometry of the primary and secondary read sensors—approximates the geometry of magnet 212.

As discussed in more detail below, the TDMR geometry is modified by offsetting the secondary read sensor in the direction of data track N+1 such that the secondary sensor is located over the squared-off side of magnet 212. In addition, while the primary read sensor is configured to maximize the signal response to magnet 212, the secondary read sensor can be configured—via sensor gap, sensor width, and channel response—to maximize the signal response to the squared-off end of magnet 212, and in particular to maximize the signal-to-noise ratio (SNR) of the combined read/back magnets from the primary read sensor and the secondary read sensor, as discussed in more detail below. In particular, FIGS. 3A-5 illustrate various methods of creating the desired offset between the primary read sensor and the secondary read sensor. FIGS. 6-8B illustrate filtering applied to the read-back signals provided by the primary read sensor and the secondary read sensor to alter the TDMR geometry as desired to maximize the SNR of the read-back signal.

Figure 3C:
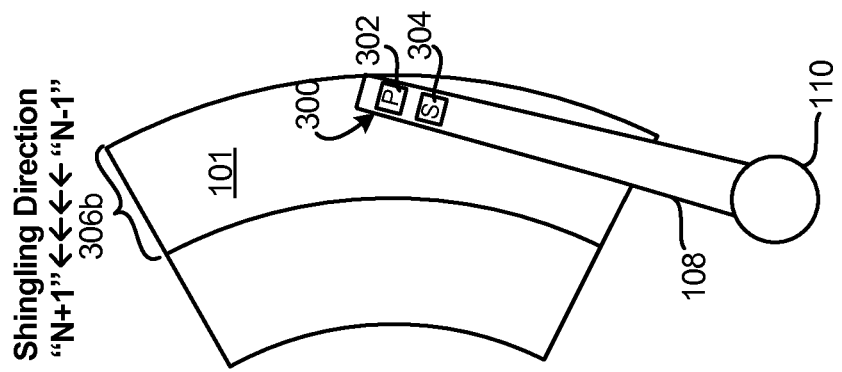
FIGS. 3A-3C are top views illustrating position of a dual-stacked reader positioned over various radial positions of a magnetic media by an actuator arm according to an embodiment of the present invention.
Figure 3B:
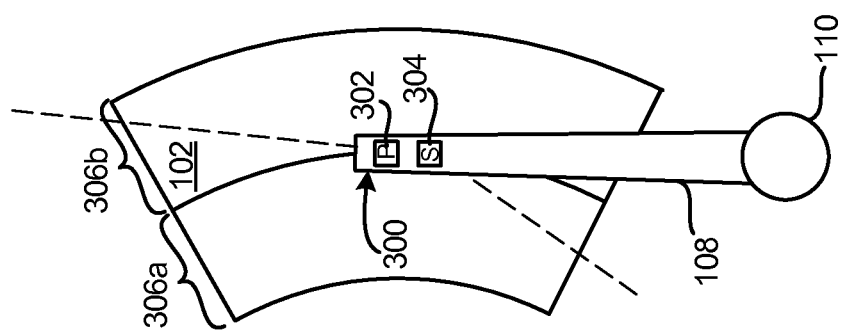
Figure 3A:
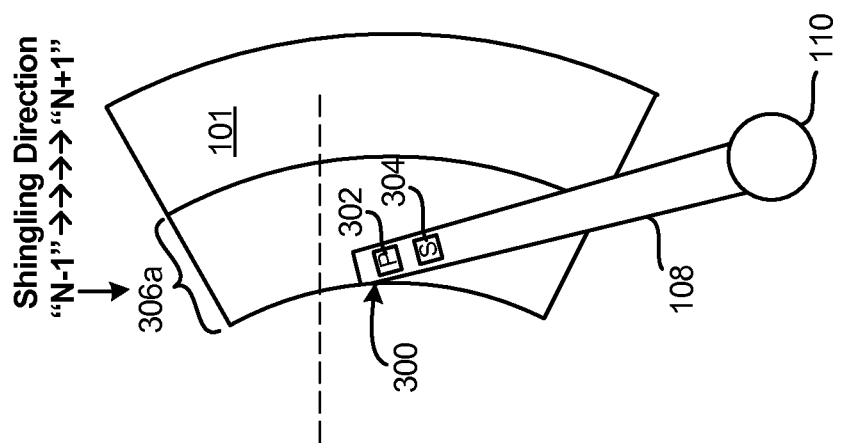

FIGS. 3A-3C are top views illustrating position of dual-stack reader 300 positioned over various radial positions of magnetic media 102 by actuator arm 108 according to an embodiment of the present invention. FIGS. 3A-3C are simplified views that illustrate the reader portion of transducer 106 (shown in FIG. 1), which would typically include both a read sensor and a writer. In some applications, the direction of offset may not affect performance. For example, referring to the example shown in FIG. 2A in which magnet 202 is symmetrical, whether secondary read sensor 304 is offset to the left or right side is not relevant. However, in other applications—such as SMR, shown in FIG. 2B—it may be beneficial to offset secondary read sensor 304 in a particular direction (e.g., N+1 or N−1 side of the data track being read) and maintain that offset at all times in order to generate the desired TDMR reader "geometry". FIGS. 3A-3C illustrates the difficulty in maintaining a consistent direction and magnitude of offset.

For example, in FIG. 3A, dual-stack read sensor 300 is positioned over an inner diameter (ID) of data recording disk 102, and as a result secondary read sensor 304 is offset radially outward of primary read sensor 302. However, when dual-stack read sensor 300 is positioned over an outer diameter (OD) of data recording disk 102—as shown in FIG. 3C—then secondary read sensor 304 is offset in a radially inward direction. As expected, when dual-stack read sensor 300 is positioned over the radial mid-point of data recording disk 102, then secondary read sensor 304 is aligned with primary read sensor 302. FIGS. 3A-3C illustrate how offset between primary read sensor 302 and secondary read sensor 304 is created by the angle/position of actuator 108. Because the angle/position of actuator 108 changes depending on the data track being read, this offset between primary read sensor 302 and secondary read sensor 304 is a variable offset that will be maximized at the edges of storage disk 102. In addition, the magnitude of the variable offset depends on the down-track separation between primary read sensor 302 and secondary read sensor 304 (i.e., the distance between the sensors in the down-track direction, as opposed to the cross-track direction). Minimizing the down-track separation distance minimizes the magnitude of the variable offset. As discussed in more detail below, however, in some embodiments sensor gain is optimized by selecting a non-zero down-track separation distance.

In SMR applications, to maintain the offset of secondary read sensor 304 in the same direction (e.g., either the N+1 or N−1 data track direction), the direction in which the data tracks are written is modified. For example, the inner portion 306a of data recording disk 102 (shown in FIG. 3A) is written from an inner diameter (ID) to an outer diameter (OD). In this way, when dual-stack read sensor 300 is positioned over the inner portion 306a, secondary read sensor 304 is radially offset from primary sensor 302 in the direction of read track N+1. In contrast, the outer portion 306b of data recording disk 102 (shown in FIG. 3C) is written from the OD to the ID such that when dual-stack read sensor 300 is positioned over OD portion 306b, secondary read sensor 304 remains radially offset from primary read sensor 302 in the direction of read track N+1. As a result, whether dual-stack read sensor 300 is positioned over the inner portion 306a or outer portion 306b, secondary read sensor 304 is maintained offset in the direction of read track N+1.

FIG. 4 is a top view illustrating in more detail the sensor offset created by actuator skew. As discussed with respect to FIGS. 3A-3C, above, one way of offsetting secondary read sensor 404 from the primary read sensor 402 is via the skew caused by the actuator arm 108. This type of offset—referred to as skew offset—is illustrated in FIG. 4 and varies based on the location and angle of actuator arm 108 as well as the down-track separation between primary read sensor 402 and secondary read sensor 404. In the embodiment shown in FIG. 4, primary read sensor 402 is aligned with secondary read sensor 404 along the axis of actuator arm 108. However, with respect to track N of data recording medium 102, secondary read sensor 404 is offset from primary read sensor 402 by a length indicated by the label "skew offset".

Figure 5:
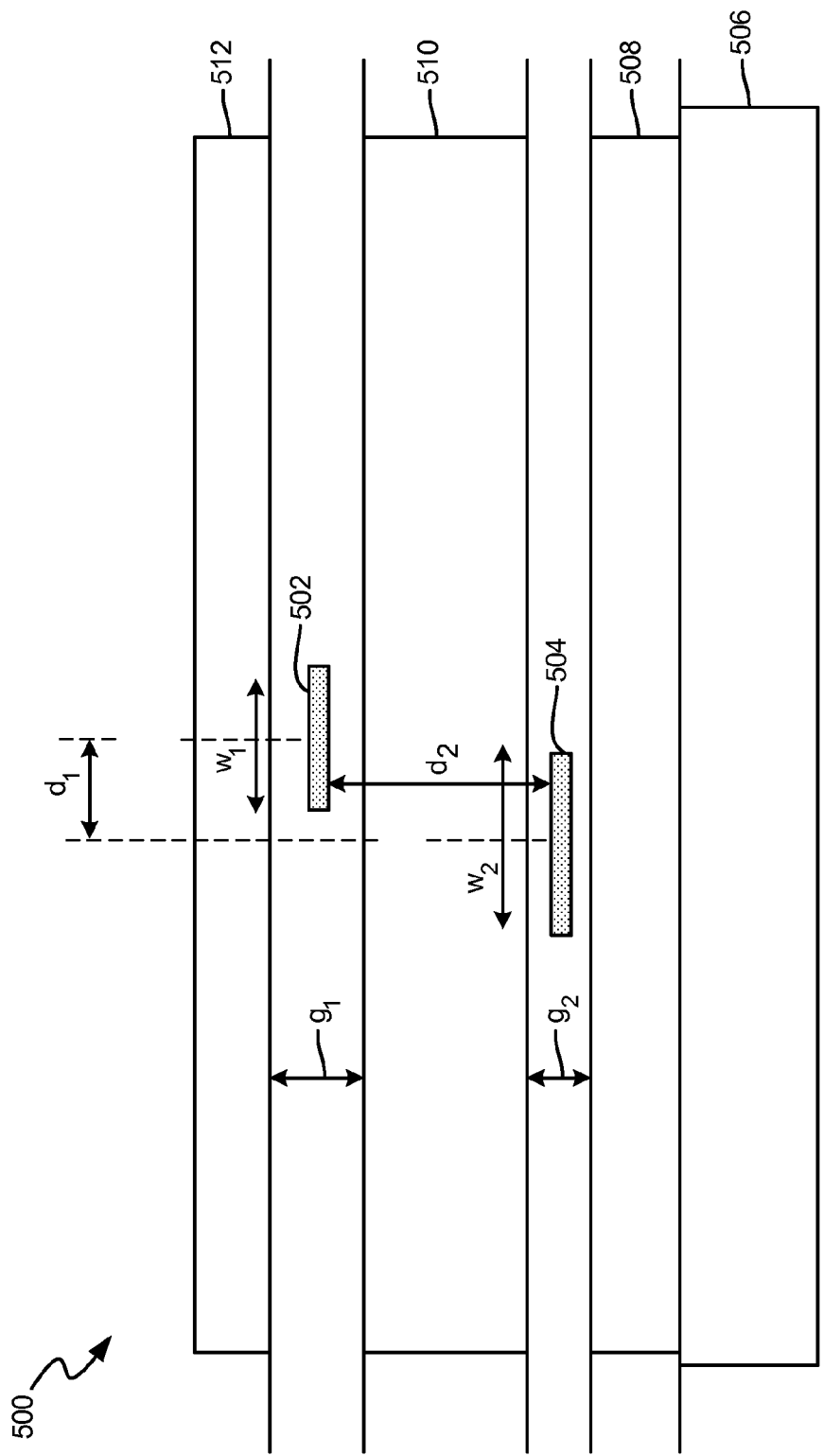
FIG. 5 is an air-bearing surface (ABS) view of a dual-stacked reader according to an embodiment of the present invention.

FIG. 5 is an air-bearing surface (ABS) view of dual-stacked reader 500 according to an embodiment of the present invention. Dual-stacked reader 500 includes primary read sensor 502 and secondary read sensor 504, formed on ceramic slider 506. A plurality of shields, including trailing shield 508, center shield 510 and leading shield 512 are located around and between primary read sensor 502 and secondary read sensor 504.

In particular, FIG. 5 illustrates another way of introducing sensor offset between primary read sensor 502 and secondary read sensor 504, in which secondary read sensor 504 is physically offset from primary sensor 502 by distance d1 within the slider assembly. This is in contrast with the embodiment shown in FIGS. 3A-3C and 4, in which the secondary read sensor is aligned with the primary read sensor. As a result, the sensor offset shown in FIG. 5 is fixed, not variable like the offset shown in FIG. 4. However, even though the sensor offset if 'fixed' in FIG. 5, dual-stack reader 500 will still have to contend with the additional, variable offset introduced by actuator arm 108 (i.e., skew offset). In addition, the ABS view of dual-stacked reader 500 illustrates several of the physical characteristics that may be modified or fine-tuned between primary read sensor 502 and secondary read sensor 504 in order to maximize the signal response of the combined signals.

In the embodiment shown in FIG. 5, dual-stacked reader 500 is built on a ceramic slider or wafer 506. Trailing shield 508 is formed on top of wafer 506, and secondary read sensor is formed on top of trailing shield 508. Because secondary read sensor 504 is constructed first, it is sometimes referred to as the "lower" read sensor. Center shield 510 is located between secondary (lower) read sensor 504 and primary (upper) read sensor 502, while leading shield 512 is constructed on top of primary read sensor 502.

Each read sensor is defined by one or more physical characteristics. For example, primary read sensor 502 and secondary read sensor 504 are defined by physical characteristics that include sensor gap and sensor width. In the embodiment shown in FIG. 5, primary read sensor 502 is defined by sensor width $w_1$ and sensor gap g1. Meanwhile, secondary read sensor 504 is defined by sensor width $w_2$ and sensor gap $g_2$. In the embodiment shown in FIG. 5, sensor width $w_1$ is less than sensor width $w_2$, while sensor gap $g_1$ is greater than sensor gap $g_2$. This configuration may be utilized, for example, when a shingled magnetic recording scheme is utilized and wherein secondary read sensor 504 is offset to the N+1 side of the data track being read. The smaller sensor gap g2 provides a sharper sensor image on the N+1 side of the data track that corresponds with the squared off end of the written magnet (e.g., magnet 212 shown in FIG. 2B). In addition, the wider sensor width w2 is selected to allow readback of the desired data track despite offset of the secondary read sensor 504. In other embodiments, various values of sensor gap g1, g2 and sensor width w1, w2 may be used. The physical characteristics of primary read sensor 502 and secondary read sensor 504 are one factor in the resulting TDMR geometry.

In addition, primary read sensor 502 and secondary read sensor 504 are separated in the down-track direction by a distance d2. The down-track separation distance d2 affects the variable sensor offset distance d1 at different skew angles, and is therefore an important parameter in maximizing gain of dual-stack reader 500. Placing secondary read sensor 504 immediately above to primary read sensor 502 would reduce distance d2 to zero, and would therefore minimize the variable sensor offset caused by actuator arm skew—although a desired sensor offset distance d1 could still be provided via fixed sensor offset. However, reducing down-track separation distance d2 to zero requires that center shield 510 be reduced to essentially zero, which is undesirable. Therefore, at least some down-track separation distance d2 will always be present. In some applications—such as SMR—it is desirable to provide a non-zero down-track separation distance such that a desired cross-track offset is created between primary read sensor 502 and secondary read sensor 504 over a favorable range of radii on the disk. In one embodiment, a down-track separation distance d2 of approximately 50-100 nanometers (nm) or between 1 and 2 times the track-pitch optimizes the gain provided by dual-stack reader 500 operating over a skew range of +15 to −15 degrees.

Figure 6:
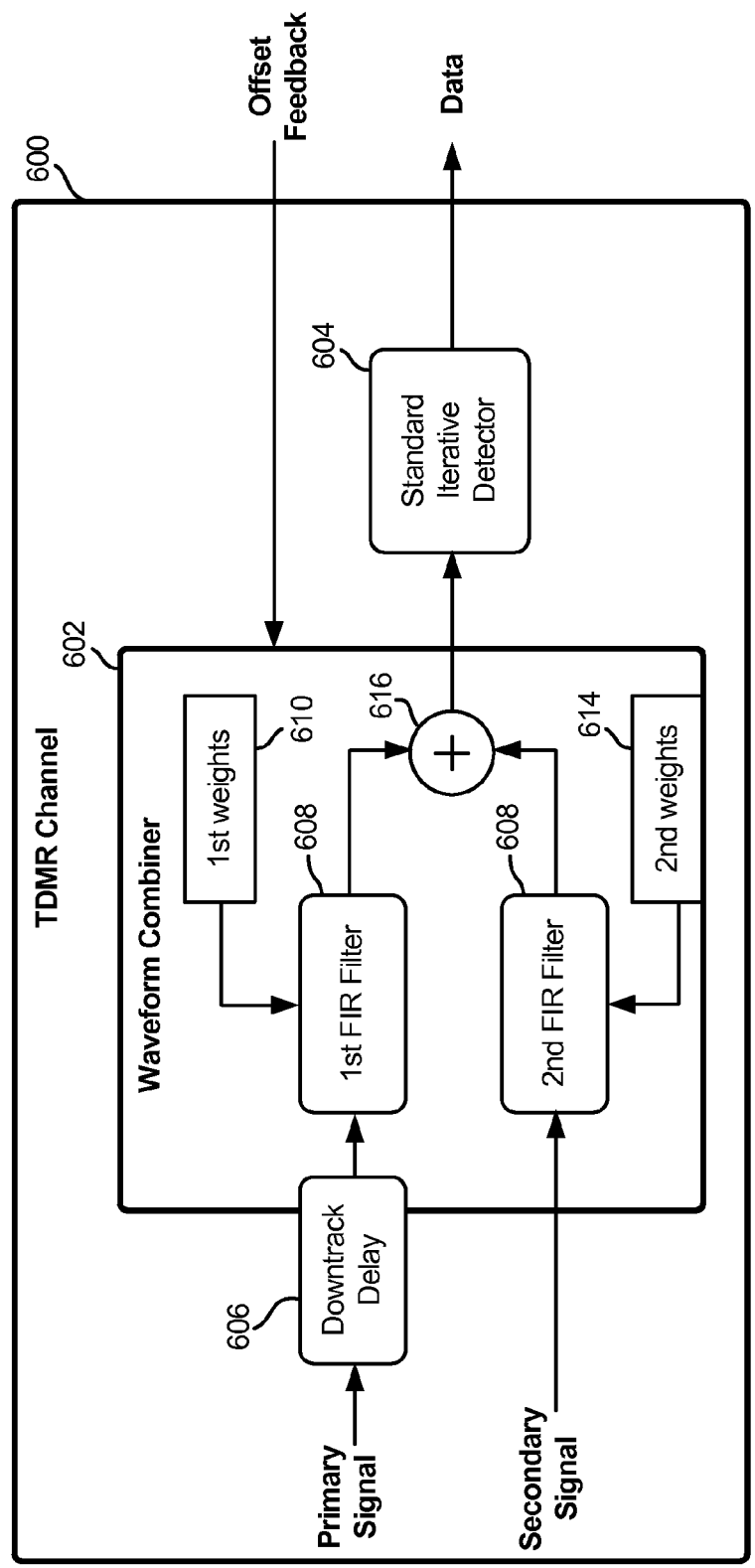
FIG. 6 is a block diagram of a two-dimensional magnetic recording (TDMR) channel according to an embodiment of the present invention.

FIG. 6 is a block diagram illustrating operations performed by read data channel 600 according to an embodiment of the present invention. Read data channel 600 may be incorporated within read/write data channel unit 118 as shown in FIG. 1. Read data channel 600 includes waveform combiner 602 and standard iterative detector 604. Wave combiner 602 in turn includes down-track delay 606, first finite response (FIR) filter 608 utilizing first weights 610, second FIR 612 utilizing second weights 614, and combiner block 616.

In the embodiment shown in FIG. 6, the primary read sensor is located downtrack from the secondary read sensor. As a result, the primary read-back signal is sensed first and therefore must be delayed or buffered in order to align the primary read-back signal with the secondary read-back signal. For this reason, primary read-back signal is provided through down-track buffer 606 while secondary read-back signal is un-buffered—or if buffered, still delayed relative to the primary readback signal. In other embodiments, depending on the placement of the primary read sensor relative to the secondary read sensor, down-track delay or buffer 606 may be applied to the secondary read-back signal rather than the primary read-back signal.

First weights 610 define the operation of first FIR filter 608, while second weights 614 define the operation of second FIR filter 612. Typically, FIR filter weights are selected to maximize a received read-back signal. However, with respect to embodiments of the present invention, the goal is not necessarily to maximize a received read-back signal from each read sensor, but rather to maximize the combination of the read-back signals from two or more read sensors. For example, in an embodiment utilizing shingled magnetic recording (SMR), the primary read sensor may be centered over the data track to be read (or offset only slightly), while the secondary read sensor is offset from the primary read sensor. As a result, while it may be desirable to maximize the read-back signal sensed by the primary read sensor, it may not necessarily be desirable or beneficial to maximize the read-back signal from the secondary read sensor. Rather, the goal is to maximize the combination of the first read-back signal sensor and the second read-back signal. As a result, first weights 610 may differ substantially from second weights 614. In addition, as the offset between the primary read sensor and secondary read sensor varies—for example, due to actuator skew—the first and second weights may be modified to accommodate the changing offset. This offset feedback may include track information, servo position information, or other data that can be used to determine the weights required.

The filtered outputs provided by first FIR filter 608 and second FIR filter 612 are combined at combiner block 516. In the embodiment shown in FIG. 6, combiner block 516 sums the filtered outputs provided by first FIR filter 608 and second FIR filter 612. In other embodiments, other well-known types of signal combination may be utilized to combine the outputs of the first and second filters 608, 612. The combined output is provided to iterative detector 604 for detection of symbols associated with the data track being read. Having combined outputs from the primary read sensor and the secondary read sensor, iterative detector 604 may be a standard iterative detector.

Figure 7A:
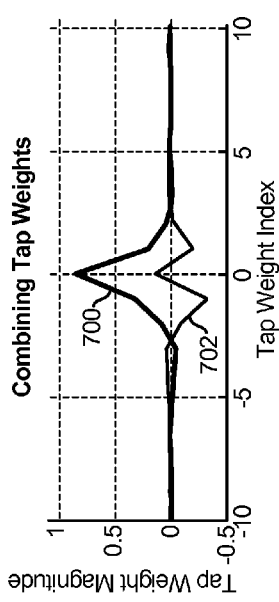
FIGS. 7A-7C are graphs illustrating filter design of the primary sensor response and the secondary sensor response according to an embodiment of the present invention.
Figure 7B:
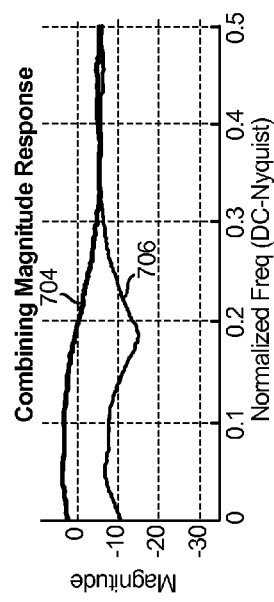
Figure 7C:
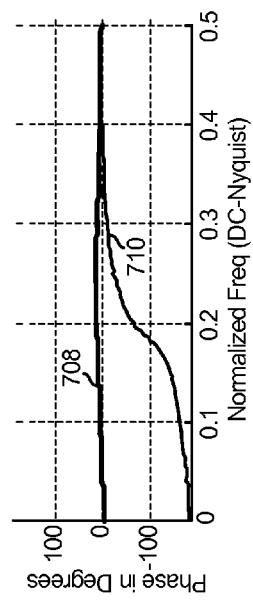

FIGS. 7A-7C are graphs illustrating performance of the first FIR filter and the second FIR filter according to an embodiment of the present invention. Depending on the application, FIR filter design may be modified as necessary and may in fact be modified dynamically during operation. The embodiment shown in FIGS. 7A-7C is based on a design for read-back of a shingled magnetic recording system, but it should be understood that the design would be modified to accommodate other types of magnetic recording schemes. In addition, the embodiment shown in FIGS. 7A-7C is based on sensor offset between the primary read sensor and secondary read sensor of 7.5 nanometers (nm).

FIG. 7A illustrates the distribution of first weights (illustrated by line 700) and second weights (illustrated by dashed line 702). The respective weights represent time-domain filter coefficients, wherein the x-axis represents the downtrack direction, giving the filter a spatial component. The y-axis represents the magnitude of the tap weight applied at each point. In particular, the graph shown in FIG. 7A represents the output that would be generated by the respective FIR filters by inputting a single pulse—hence the name, finite impulse response. In the embodiment shown in FIG. 7A, first weight 700 is centered around the midpoint with a peak value located at a weight index of zero, along with several other values centered around the peak value. In contrast, second weight 702 is different than first weight 700, and includes a saw-tooth shape centered around the midpoint. The weights indicate the multiplication factor applied to the read-back signal at each lag, and as illustrated in FIG. 7B-7C below, affect the magnitude and phase of the frequency response.

FIG. 7B illustrates the magnitude response resulting from the selected first and second weights, respectively. The x-axis represents normalized frequency while the y-axis represents magnitude of the frequency response. The embodiment shown in FIG. 7B illustrates the primary magnitude response 704 and secondary magnitude response 706 resulting from the weights selected with respect to FIG. 7A. The selection of different weights would alter the frequency response of each filter.

With respect to selected first weights, the resulting primary magnitude response 704 is represented by relatively constant magnitudes, although slightly higher response is found at lower frequencies. In contrast, the secondary magnitude response 706 is represented by a relatively low magnitude response at low frequencies, but a higher magnitude response at higher frequencies. In particular, with respect to the embodiment shown in FIG. 7B, the primary magnitude response 706 and secondary magnitude response 708 are approximately equal to one another at higher frequencies, wherein the primary magnitude response 706 is significantly higher than the secondary magnitude response 708 at lower frequencies.

FIG. 7C illustrates the phase response resulting from the selected weights. Once again, the x-axis represents the normalized frequency, while the y-axis represents phase in degrees. The phase is important when considering how the resulting filtered outputs are combined with one another by summer block 616, shown in FIG. 6. Read-back signals that are out-of-phase with one another result in a subtraction of one signal from another. Read-back signals that are in-phase with one another result in an addition of signal to another. In the embodiment shown in FIG. 7C, at low frequencies the secondary phase response 710 is 180 degrees out-of-phase with the primary phase response 708, meaning that at low frequencies the filtered response provided by second FIR filter 612 is subtracted from the filtered response provided by first FIR filter 608 (shown in FIG. 6). In contrast, at higher frequencies, the secondary phase response 710 is in-phase with the primary phase response 708, meaning that at higher frequencies the filtered response provided by second FIR filter 612 is added to the filtered response provided by the first FIR filter 608.

The filter design shown in FIGS. 7A-7C are utilized in conjunction with a SMR scheme such as that described with respect to FIG. 2B. The offset of the secondary read sensor on the N+1 side of the data track places the secondary read sensor near the squared-off end of magnet 212. Because the squared-off end is narrower, it provides a higher frequency read-back signal than the opposing, hooked shaped side of magnet 212. The higher frequency response of second FIR filter 612 is selected to optimize the contribution of the second read-back signal to the first read-back signal. A benefit of adding high-frequency responses with a similar magnitude (as indicated in FIG. 7B) and in-phase with one another (as indicated in FIG. 7C) is that this helps reduce the contribution of electronic noise. In contrast, a benefit of subtracting the low-frequency response of the secondary read sensor from the primary read sensor is that this reduces inter-track interference (ITI). In addition, in some embodiments the primary read sensor is similarly offset to the N+1 side of the adjacent data track—although not as substantially as the secondary read sensor—to further reduce jitter and electronic noise. That is, in at least one embodiment, rather than center the primary read sensor on the data track to be read, it is also offset to the N+1 side, with the secondary read sensor offset to the N+1 side of the primary read sensor.

Figure 8A:
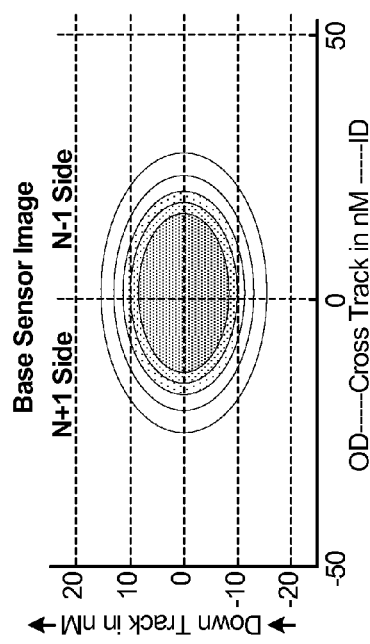
FIGS. 8A-8B are sensor images that illustrate the sensor image resulting from the primary sensor, and the combination of the primary sensor and secondary sensor, respectively, according to an embodiment of the present invention.
Figure 8B:
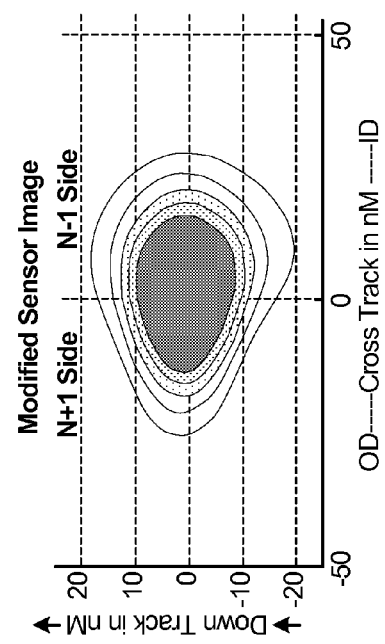

FIGS. 8A-8B are sensor images that illustrate the sensor image resulting from the primary sensor and the combination of the primary sensor and secondary sensor, respectively, according to an embodiment of the present invention. FIG. 8A illustrates the sensor image generated by the primary read sensor, wherein the sensor image is generally oval in shape and centered on the data track being read. FIG. 8B illustrates the sensor image as modified by combination with the secondary read-back signal. In particular, as a result of the offset in the N+1 track direction of the secondary read sensor, as well as weights selected with respect to the primary read-back signal and secondary read-back signal, the sensor image is modified from the generally oval shape to be "sharper" on the N+1 side and "broader" on the N−1 side. In particular, the sharpening on the N+1 side indicates better high-frequency response to magnets (i.e., data), while the broadening on the N−1 side indicates better a low-frequency response. With reference to FIG. 2B, the sensor image provided in FIG. 8B has geometry more similar to geometry of magnet 212. As a result, the performance of the dual-stack read sensor is improved over traditional read sensor geometries.

In this way, the present provides a dual-stacked read sensor that provides improved read-back of data written to a storage medium. By offsetting the secondary read sensor from the primary read sensor, the combination of primary read-back signal and secondary read-back signal results in a signal-to-noise ratio that is an improvement over either of the read sensors performance individually. In particular, based on the type of writing schemed used to write data to the storage medium, the physical characteristic of the primary read sensor and secondary read sensor are selected such that the sensor image represented by the combined read-back signals more closely approximates the geometry of the individual magnets (i.e., data bits). In addition to different physical characteristics between the primary read sensor and the secondary read sensor, the signal processing associated with each read-back signal (e.g., primary and secondary FIR filters) are selected to maximize the combination of the primary read-back signal with the secondary read-back signal. For example, in storage mediums utilizing shingled magnetic recording, the secondary read sensor may be offset in the N+1 direction of the data track relative to the primary read sensor, and may be designed with physical characteristics (wider sensor width, narrower sensor gap) different from the primary read sensor to emphasize read-back of the geometry seen by the secondary read sensor. Finally, the signal processing of the primary and secondary read-back signals may be selected such that the combined read-back signals provide a sensor image that more closely approximates the geometry of the sensed magnet.

The techniques of this disclosure may be implemented in a wide variety of devices or apparatuses, and may utilizes a combination of hardware and software to implement the desired signal processing of read-back signals. Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A dual-stack read sensor utilized in a storage device, the dual-stack read sensor comprising:
   a primary read sensor having a first set of read sensor characteristics; and
   a secondary read sensor having a second set of read sensor characteristics that differ from the first set of read sensor characteristics, wherein the secondary read sensor is offset, relative to a data track being read, from the primary read sensor, wherein the first and second set of read sensor characteristics includes at least one of sensor gap and sensor width and wherein the secondary read sensor has a sensor gap that is less than a sensor gap of the primary read sensor.

2. The dual-stacked read sensor of claim 1, wherein down-track separation between the primary read sensor and the secondary read sensor is a non-zero value selected to maximize gain.

3. A read channel utilized in storage device, the read channel comprising:
   a primary read sensor;
   a secondary read sensor that is offset, relative to a data track being read, from the primary read sensor;
   a first filter connected to the primary read sensor and configured based on first weights to provide a primary filtered response;
   a second filter connected to the secondary read sensor and configured based on second weights to provide a secondary filtered response; and a combination block that combines the primary filtered response and the secondary filtered response to provide a combined read-back signal with respect to a data track being read;

wherein the storage device is comprised of data tracks written using a shingled magnetic recording (SMR) scheme in which data tracks are written to partially overlap a previously written, adjacent data track.

4. The read channel of claim 3, wherein the primary read sensor is centered over the data track being read and first weights are selected to maximize the primary filtered response.

5. The read channel of claim 4, wherein the second weights are selected to maximize the combined read-back signal provided by combining the primary filtered response with the secondary filtered response.

6. The read channel of claim 3, wherein the secondary read sensor is offset from the primary read sensor in an N+1 direction.

7. The read channel of claim 6, wherein the second weights are selected such that the secondary filtered response has a magnitude response that increases at higher frequencies.

8. The read channel of claim 7, wherein the second weights are selected such that the secondary filtered response has a phase response that is out-of-phase at low frequencies and in-phase at higher frequencies.

9. The read channel of claim 3, wherein the primary read sensor has a first set of read sensor characteristics and the secondary read sensor has a second set of read sensor characteristics different from the first set of read sensor characteristics, wherein read sensor characteristics include at least one of sensor gap and sensor width.

10. A storage device comprising:
a data recording medium comprised of a plurality of data tracks;
a spindle assembly configured to rotate the data recording medium;
an actuator arm;
a dual-stack reader mounted on a distal end of the actuator arm that includes at least a primary read sensor and a secondary read sensor that is offset from the primary read sensor relative to the data track being read; and
a two-dimensional magnetic recording (TDMR) read channel comprising a first filter connected to the primary read sensor, a second filter connected to the secondary read sensor, and a combination block to combine the outputs of the first filter and the second filter, wherein the first filter and second filter are designed to provide a sensor sensitivity-function geometry that approximates a geometry of a magnet written to the data recording medium.

11. The storage device of claim 10, wherein the first filter is configured based on first weights to provide a primary filtered response and the second filter is configured based on second weights to provide a secondary filtered response, wherein the second weights are selected such that the secondary filtered response has a magnitude response that increases at higher frequencies.

12. The storage device of claim 11, wherein the second weights are further selected such that the secondary filtered response has a phase response that is out-of-phase at low frequencies and in-phase at higher frequencies.

13. The storage device of claim 12, wherein the secondary read sensor has a sensor gap that is less than a sensor gap of the primary read sensor, and the secondary read sensor has a sensor width that is greater than a sensor width of the primary read sensor.

14. A dual-stack read sensor utilized in a storage device, the dual-stack read sensor comprising:
a primary read sensor having a first set of read sensor characteristics; and
a secondary read sensor having a second set of read sensor characteristics that differ from the first set of read sensor characteristics, wherein the secondary read sensor is offset, relative to a data track being read, from the primary read sensor, wherein the first and second set of read sensor characteristics includes at least one of sensor gap and sensor width and wherein the secondary read sensor has a sensor width that is greater than a sensor width of the primary read sensor.

15. A dual-stack read sensor utilized in a storage device, the dual-stack read sensor comprising:
a primary read sensor having a first set of read sensor characteristics; and
a secondary read sensor having a second set of read sensor characteristics that differ from the first set of read sensor characteristics, wherein the secondary read sensor is offset, relative to a data track being read, from the primary read sensor;
wherein the secondary read sensor is aligned with the primary read sensor along an axis of an actuator arm used to position the dual-stack read sensor, wherein offset of the secondary read sensor, relative to the data track being read, from the primary read sensor is a result of actuator skew associated with the position of the actuator arm.

16. A dual-stack read sensor utilized in a storage device, the dual-stack read sensor comprising:
a primary read sensor having a first set of read sensor characteristics; and
a secondary read sensor having a second set of read sensor characteristics that differ from the first set of read sensor characteristics, wherein the secondary read sensor is offset, relative to a data track being read, from the primary read sensor;
wherein the secondary read sensor is offset from the primary read sensor along an axis of an actuator arm used to position the dual-stack read sensor.

17. A dual-stack read sensor utilized in a storage device, the dual-stack read sensor comprising:
a primary read sensor having a first set of read sensor characteristics; and
a secondary read sensor having a second set of read sensor characteristics that differ from the first set of read sensor characteristics, wherein the secondary read sensor is offset, relative to a data track being read, from the primary read sensor;
wherein the storage device is comprised of data tracks written using a shingled magnetic recording (SMR) scheme in which data tracks are written to partially overlap a previously written, adjacent data track.

18. The dual-stacked read sensor of claim 17, wherein the secondary read sensor is offset from the primary read sensor in an N+1 direction.

19. The dual-stacked read sensor of claim 18, wherein the primary read sensor is centered over a data track to be read.

20. The dual-stacked read sensor of claim 18, wherein the primary read sensor is offset in the N+1 direction relative to a center of the data track.

21. A dual-stack read sensor utilized in a storage device, the dual-stack read sensor comprising:
a primary read sensor having a first set of read sensor characteristics; and
a secondary read sensor having a second set of read sensor characteristics that differ from the first set of read sensor characteristics, wherein the secondary read sensor is offset, relative to a data track being read, from the primary read sensor;

wherein down-track separation between the primary read sensor and the secondary read sensor is a non-zero value selected to maximize gain.

22. A read channel utilized in storage device, the read channel comprising:

a primary read sensor;

a secondary read sensor that is offset, relative to a data track being read, from the primary read sensor;

a first filter connected to the primary read sensor and configured based on first weights to provide a primary filtered response;

a second filter connected to the secondary read sensor and configured based on second weights to provide a secondary filtered response, wherein the first weights and the second weights are dynamically selected; and a combination block that combines the primary filtered response and the secondary filtered response to provide a combined read-back signal with respect to a data track being read.

23. The read channel of claim 22, wherein the first and second weights are selected based on position of the primary read sensor and secondary read sensor.

\* \* \* \* \*